Oct. 27, 1970 K. IVERSEN 3,536,962

DIRECT CURRENT AMPLIFIER, PARTICULARLY FOR CONTROL APPLICATION

Filed Nov. 1, 1966 2 Sheets-Sheet 1

United States Patent Office 3,536,962
Patented Oct. 27, 1970

3,536,962

DIRECT CURRENT AMPLIFIER, PARTICULARLY FOR CONTROL APPLICATION

Kristian Iversen, Sonderborg, Denmark, assignor to Danfoss A/S, Nordborg, Denmark, a company of Denmark Filed Nov. 1, 1966, Ser. No. 591,257
Claims priority, application Germany, Nov. 3, 1965, D 48,566
Int. Cl. H01h *47/26, 47/32;* H03g *3/30*
U.S. Cl. 317—131 14 Claims

ABSTRACT OF THE DISCLOSURE

Two transistors are connected in common emitter configuration; each has a negative feed-back of unity (resulting in zero amplification). Signals are applied between the bases of the transistors and amplified output is obtained as a measure of the difference of the operating point of the two transistors.

The present invention relates to a direct current transistor amplifier, and more particularly to such a direct current transistor amplifier useful in controlled applications and for connection to a sensing element measuring a physical parameter, such as temperature, humidity, or the like.

Amplifiers for sensing elements are greatly dependent on external influences; variations in supply potentials, battery potentials, changes in ambient temperature, as well as internal temperature changes due to current through transistors all change the operating point on the operating curves of the amplifier; such changes introduce distortions and undesired drift.

The operating point of the transistor can be stabilized by utilizing a negative feed-back circuit, that is by coupling the collector with the base over a resistance. As the negative feed-back is increased, in order to increase the stability of the amplifier, the amplification level, however, also decreases. Upon perfect stability, that is with a feedback of unity, no further amplification is obtained. It has thus been customary to design such amplifiers utilizing a compromise between desired stability and desired amplification level.

It is an object of the present invention to provide a direct current resistor amplifier of good stability, having a reasonable amplification of the input signal, and being economical in the use of components.

Briefly, in accordance with the present invention, the direct current transistor amplifier comprises a pair of transistors, each connected in common emitter configuration. The collector of each is provided with a load impedance. A negative feed-back resistance, which may be paralleled by a condenser, is connected between the base and collector of each of the transistors. The value of the resistance is adjusted so that the value of the feed-back is unity. Signal input is connected between the bases of the two transistors of the pair. Output is taken from one of the transistors, unsymmetrically, from the collector circuit, for example across the collector load impedance or from the emitter-collector circuit thereof. The output is applied to a trigger circuit which is bi-stable. When the input across the two bases of the transistor changes, the trigger circuit connected across one of the transistors changes state and can effect a control function, for example pulling in the relay of a valve to open fuel to a burner, cooling fluid to a cooling system, or to start or stop any other process.

Both of the transistors of the pair may be connected to an individual bi-stable trigger circuit. By applying a suitable bias between the bases of the transistors of the pair, a dead zone can be established in which the transistors will not respond. If the potential across the bases of the input changes in one direction, one of the trigger circuits will change state; if it changes in the other direction, the other one will change state. It is thus possible to arrange the circuit in such a manner that if, for example, temperature is sensed and the temperature rises, a cooling action is effected; and if the temperature falls, heat is supplied. The dead zone is adjustable, and a timing delay effect can be obtained by use of suitable condensers and RC circuits.

In an actual embodiment of the invention, the amplifier was used to control the temperature sensitive element. Ambient temperature of operation of the amplifier was changed from −20° C. to +60° C. The largest error of the amplifier within this range of change of ambient temperature was 0.02° C., indicating the extraordinary stability of the amplifier of the present invention.

The structure, organization and operation of the invention will now be described more specifically in the following detailed description with reference to the accompanying drawings, in which.

Figure 1:
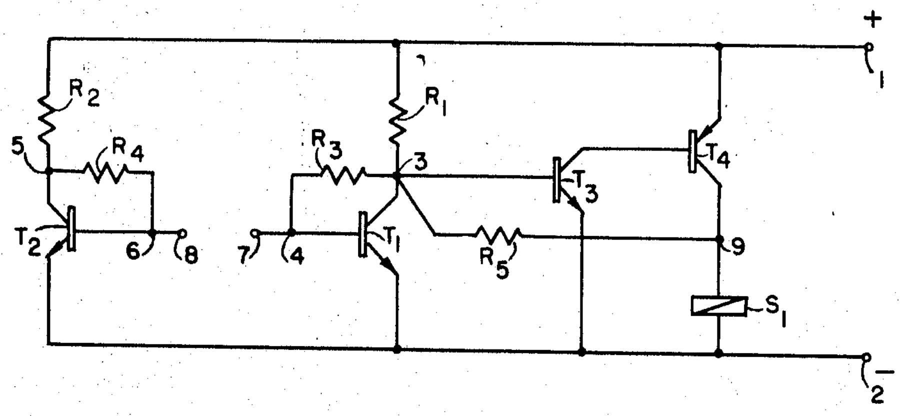
FIG. 1 is a schematic circuit diagram of an amplifier having a single output.

Referring now to the drawings, and particularly FIG. 1: a pair of transistors, preferably npn transistors $T_1$ and $T_2$ each have a collector load resistor $R_1$, $R_2$. They are connected in parallel to a source of direct current applied at terminals 1, 2 with terminal 1 positive as indicated. Between collector and base of the transistor $T_1$, that is between points 3 and 4, a negative feed-back resistor $R_3$ is inserted, dimensioned to have a negative feed-back factor of about unity. A similar resistor $R_4$ is connected between collector and base of transistor $T_2$, that is between points 5 and 6. The potential from a transducer, which may be a measuring element such as a thermostat or a humidistat of the like, is applied to signal input terminals 7, 8, and each connected to the bases of transistors $T_1$, $T_2$. The polarity is chosen such that terminal 8 is positive with respect to terminal 7.

Output from the amplifying circuit is taken from point 3; the base of a transistor $T_3$ is connected to point 3, the collector of which is connected to the base of a complementary transistor $T_4$. Transistor $T_4$ has a relay coil S1 connected in its collector circuit; when transistor $T_4$ becomes conductive due to amplification of a potential exceeding a certain value between terminals 7, 8 in the input circuit, the relay S1 will pull in. A coupling resistance $R_5$ is connected between the collector of transistor $T_1$, point 3 and the collector of transistor $T_4$, point 9.

The circuit of FIG. 1 operates as follows: negative feed-back obtained from resistances $R_3$, $R_4$ determines the operating point of the transistors $T_1$, $T_2$; thus, the potential at points 3 and 5 remains stable and independent of external influences. The application of an input signal potential $E_M$ between terminals 7 and 8, however, causes transistor $T_1$ to conduct less than transistor $T_2$. This leads to an increase of potential at point 3, a decrease of potential at point 5, amplified in accordance with the operating characteristics of the transistor. This amplification is not impeded by the negative feed-back, which is applied to each transistor separately. The negative feed-back current through resistances $R_3$ and $R_4$ does change in proportion to the potential at the points 3, and 5 respectively; the difference in potential between points 7 and 8 remains constant, however, for constant difference in input signal $E_M$ because the increase of negative feed-back current in one transistor is balanced by a similar decrease of the negative feed-back current of the other transistor. Thus, the output potential at point 3 is dependent only on the input signal between terminals 7 and 8 and not on other influences which symmetrically and equally affect both transistors $T_1$, $T_2$.

Transistor $T_3$, just as transistors $T_1$, $T_2$, are preferably of the npn-type; transistor $T_4$ is a pnp type. Thus, transistor $T_3$ will become conductive when the potential at point 3 exceeds a predetermined value. As soon as $T_3$ conducts, transistor $T_4$ likewise becomes conductive. At that point a coupling current flows over resistance $R_5$ which assures quick and positive switching of the second amplification stage, causing relay S1 to operate positively and without chatter.

Substantial feedback over coupling resistor $R_5$ causes a substantial difference of potential at point 3. The potential at point 3 would, therefore, have to decrease substantially before transistor $T_4$ can return to the nonconductive state. In the circuit according to the present invention, a portion of the coupling current from point 3 is conducted from this point 3 over negative feed-back resistor $R_3$ to point 4. Thus, a decrease in potential at point 3 results as long as coupling current through $R_5$ is present. This, again enables switching back with a small difference potential at input terminals 7, 8. This artificial decrease in potential through the negative feedback resistor $R_3$ is present, however, only due to the coupling current through $R_5$; and as soon as transistor $T_4$ becomes nonconductive, this artificial current also terminates and thus does not have any influence on the subsequent accuracy of response of the circuit to differences in potential between terminals 7 and 8.

Figure 2:
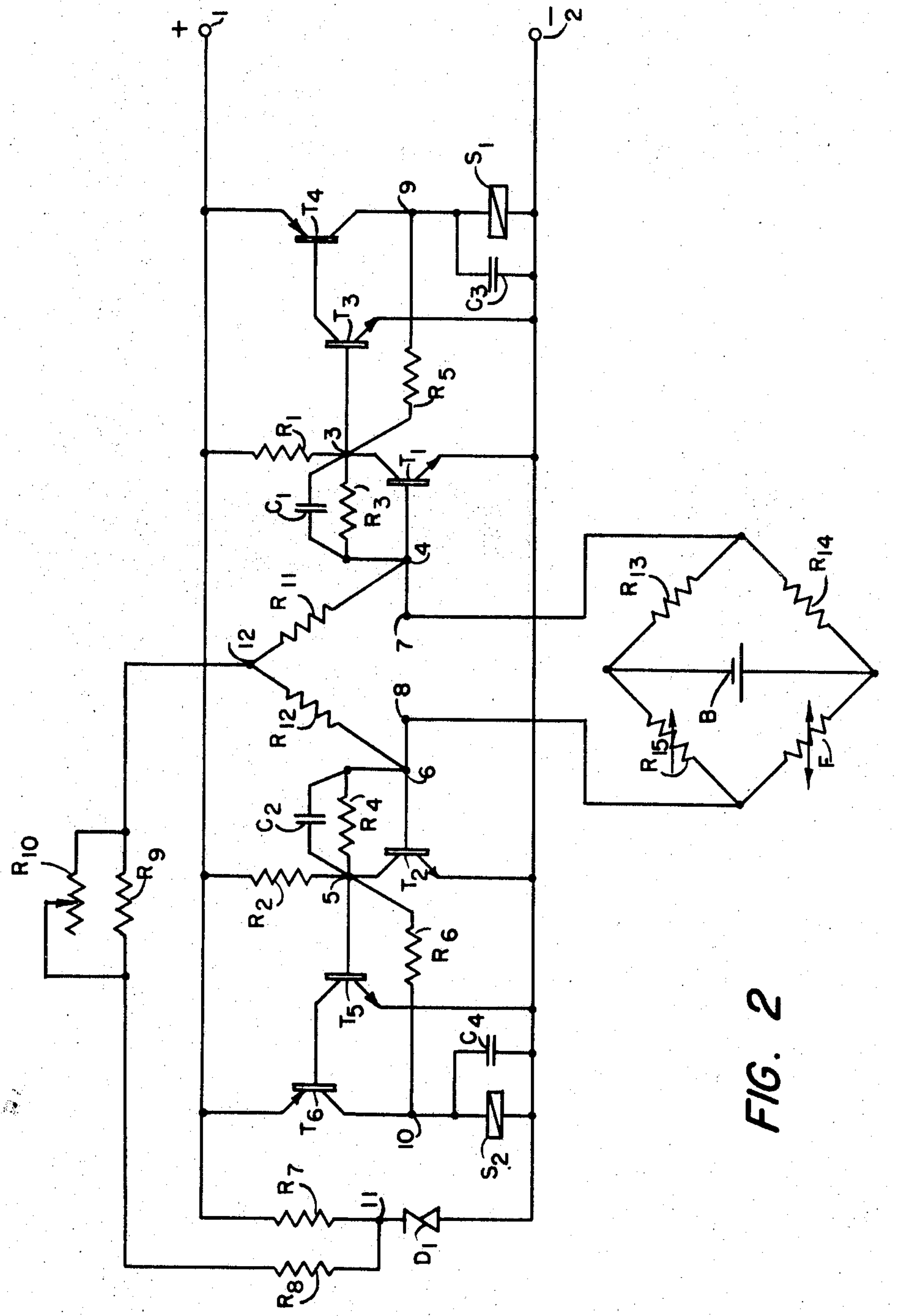
FIG. 2 is a schematic circuit diagram of an amplifier having two outputs.

The amplifier according to FIG. 2 has a pair of switching stages. Components similar to those in FIG. 1 have the same reference numerals. Thus, a switching-DC amplifier is connected to point 5 which is similar, and symmetrical to the amplifier connected to point 3, FIG. 1. A first amplifier transistor $T_5$ is connected to a second complementary transistor $T_6$; coupling resistor $R_6$ is again connected at point 10 to the collector of transistor $T_6$, and connected back to point 5. The amplifier controls a relay $S_2$. The negative feed-back resistances $R_3$, $R_4$ are bridged by capacitors $C_1$, $C_2$; condensers $C_3$ and $C_4$ are parallel to the relays $S_1$, $S_2$. By suitable choice of values of these condensers, a suitable time constant can be assigned to the circuit.

To provide adjustment for the dead band, or zone of non-response of a certain voltage level between terminals 7 and 8, bias can be applied between points 7 and 8, or connections 4 and 6, which are in parallel respectively. A voltage divider, consisting of a Zener diode $D_1$ and a resistor $R_7$ maintains a potential at point 11 constant. Resistor $R_8$, in series with a resistor $R_9$, which in turn is paralleled by a manually adjustable regulating resistor $R_{10}$, applies a predetermined potential to a point 12, from which a pair of protective resistors $R_{11}$, $R_{12}$ connect this potential to points 4 and 6. Thus, as regulating resistor $R_{10}$ is changed, the potential at points 4 and 6, and thus at points 3 and 5, can be changed equally. This changes the width of the dead-band of the control signal applied between terminals 7 and 8.

The signal applied to terminals 7 and 8 is obtained from a bridge circuit, having a pair of fixed resistors $R_{13}$, $R_{14}$, a settable resistor $R_{15}$, and a transducer element F.

Transducer F may be a temperature sensitive resistance or the like. A battery B supplies current to the bridge circuit.

Figure 3:
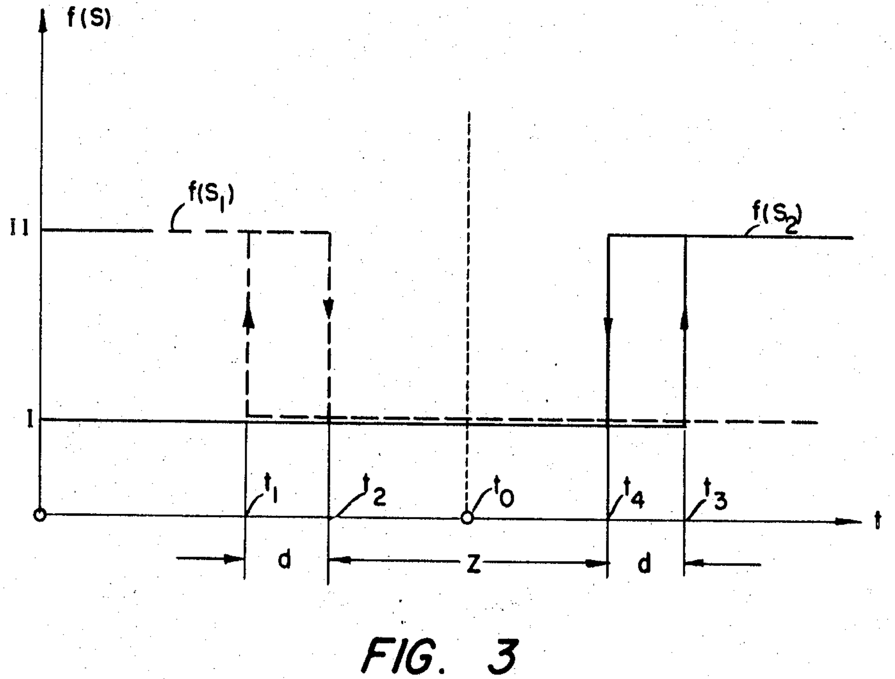
FIG. 3 is a timing diagram of the operation of the amplifier in accordance with FIG. 2.

Let it be assumed that temperature in a space is to be measured by means of the circuit of FIG. 2, and that, depending on the measured temperature, relay $S_1$ controls a fuel supply valve to supply heat to the space and relay $S_2$ controls a cooling medium valve. The actual operation and the time sequence are illustrated in FIG. 3, in which the abscissa indicates temperature, and the ordinate, in block form, the condition f of the relays S.

Temperature $t_0$ is the central, or mean temperature, which does not cause operation of the amplifier and its connected switching circuit in any manner. No potential is applied between terminals 7 and 8. If the temperature drops to a value $t_1$, the switching amplifier at the right of terminal 7 (FIG. 2) changes from its state I to the state II, and relay $S_1$ is energized. Heat is supplied due to control of relay $S_1$. As the temperature rises and reaches the value of $t_2$, the amplifier reverts back to the condition I, and no further heat will be supplied. As the temperature further rises and reaches a value $t_3$, the switching amplifier at the left of terminals 7, 8 is energized and reaches condition II, so that cooling medium is supplied to the space. As the temperature decreases and reaches the value $t_4$, the left amplifier stage switches back to condition I. A dead band exists between temperature $t_2$ and $t_4$, in which the entire arrangement is inactive, so that there is no interference between heating and cooling and no hunting. The difference between the temperatures $t_1$ and $t_2$; and $t_3$ and $t_4$, respectively, is an on-off differential $d$; it is desirable in order to provide stability for the regulating apparatus.

The value $t_0$ can be changed by changing the setting of resistor $R_{15}$ in the transducer (FIG. 2) network. The width of the dead band $z$ can be changed by changing the resistor $R_{10}$ in the network of FIG. 2. The on-off differential $d$ is usually wired into the network; it can be regulated by changing the value of the coupling resistors $R_5$, $R_6$. By providing a potentiometer in lieu of fixed resistors $R_5$, $R_6$, this differential is adjustable to a desired value.

It is apparent from the schematic circuits of FIGS. 1 and 2 that the potential can be obtained as shown, that is directly from the collector of transistors $T_1$, $T_2$; it could, of course, also be obtained from any other point within the collector-emitter circuit, or from suitable tap points on collector resistors $R_1$, $R_2$.

The present invention thus relates to a DC transistor amplifier in which a pair of transistors are used, each having negative feed-back of about unity applied thereto in order to operate them stably; and the amplification is obtained by applying potentials to the transistors so that they will operate at different working points of their working curves, but each still stably with its unity feed-back; and output is obtained from the transistors by unsymmetrical connections.

I claim:

1. DC transistor amplifier comprising a singal input; an output circuit; a pair of transistors, each transistor of said pair being connected in common emitter configuration and having a collector load impedance connected thereto, and a negative feedback resistance connected between base and collector and of such value to provide a feed-back of unity; means connecting the signal input between the bases of said transistors of the pair; said output circuit being connected unsymmetrically to the collector circuit of one of said transistors.

2. Amplifier as claimed in claim 1 wherein said output circuit includes a trigger circuit, and said pair of transistors forms an input circuit for the amplifier, said trigger circuit being connected over a DC connection with the collector of one of said transistors.

3. Amplifier as claimed in claim 2 wherein the trigger circuit includes a DC complementary transistor amplifier comprising a pair of complementary transistors in which the collector of the first transistor is connected to the base of said second transistor of said complementary pair, an impedance interconnects the base of the first and the collector of the second transistor of said complementary pair; and a controlled switching means is provided, connected into the collector circuit of said second transistor of said complementary pair.

4. Amplifier as claimed in claim 3 wherein the first transistor of said complementary pair is connected to the collector circuit of the transistor of said pair of transistors in common emitter configuration, said pair of transistors and said first transistor being of the same type.

5. Amplifier as claimed in claim 1 including a condenser in parallel with said negative feed-back resistance.

6. Amplifier as claimed in claim 3 wherein said switching means is a relay coil.

7. Direct current amplifier particularly for control application of physical parameters such as temperature, humidity etc. having two transistors coupled in a common emitter configuration, between which input terminals consisting of two base electrodes an input voltage is applied and with current feedback, the improvement comprising:

(a) a series connection of the emitter-collector section and collector load resistance ($R_1$, $R_2$) of the two transistors ($T_1$, $T_2$) in parallel, (b) for each transistor a resistance ($R_3$, $R_4$) between collector and base of each transistor ($T_1$, $T_2$) establishing negative current feedback of about unity, (c) an input voltage source connected to input terminals connected to the bases of said transistors having little internal resistance compared with the input resistance of both transistors ($T_1$, $T_2$), such that the sum of both feedback currents flowing towards the input terminals are practically constant.

8. Amplifier according to claim 7, means for taking out an output signal unsymmetrically from the emitter-collector section and from the collector load resistance of said transistors.

9. Amplifier according to claim 7, in which said transistors $T_1$, $T_2$ comprises an input stage of the amplifier and means supplying an unsymmetrical output voltage to said input stage comprising a bistable DC amplifier stage ($T_3$, $T_4$, $T_5$, $T_6$) a positive current feedback circuit ($R_5$, $R_6$) connected to said DC amplifier stages and the collector electrode of a corresponding transistor of the input stage.

10. Amplifier according to claim 7, in which collector-electrodes of both transistors of the input stage each are connected to a bistable trigger circuit ($T_3$, $T_4$; $T_5$, $T_6$), a positive feedback circuit ($R_5$, $R_6$), connected between the collector-electrodes of both transistors and the last mentioned circuit.

11. Amplifier according to claim 10, said input voltage source including means applying an adjustable voltage symmetrically to the base of said input stage transistors and including a protective resistor ($R_{11}$, $R_{12}$) connected to each base.

12. Amplifier according to claim 11, in which the bistable trigger circuit consists of a direct current complementary amplifier ($T_3$, $T_4$; $T_5$, $T_6$) connecting the collector of the first transistor is connected to the base of the second transistor of said input stage, and positive feedback resistors ($R_5$, $R_6$) connected between the base of the first transistor and collector of the second transistor, whereby the collector of the second transistor is supplied with a load resistance.

13. Amplifier according to claim 12, characterized by that the transistors of the complementary amplifier are of the same type as the tranistors of the input stages ($T_1$, $T_2$), said transistors comprising NPN-type transistors.

14. Amplifier according to claim 7, in which the input voltage source is a sensing-bridge circuit.

References Cited

UNITED STATES PATENTS

| | | | |
|---|---|---|---|
| 3,247,462 | 4/1966 | Kobbe | 330—30 X |
| 3,316,423 | 4/1967 | Hull | 317—148.5 X |
| 3,344,283 | 9/1967 | Stubbs | 330—28 X |

JAMES D. TRAMMELL, Primary Examiner

U.S. Cl. X.R.

317—148.5; 330—25, 28, 30